April 8, 1930.  R. KOENIG ET AL  1,753,863
ELECTRIC PERCOLATOR
Filed Sept. 4, 1928
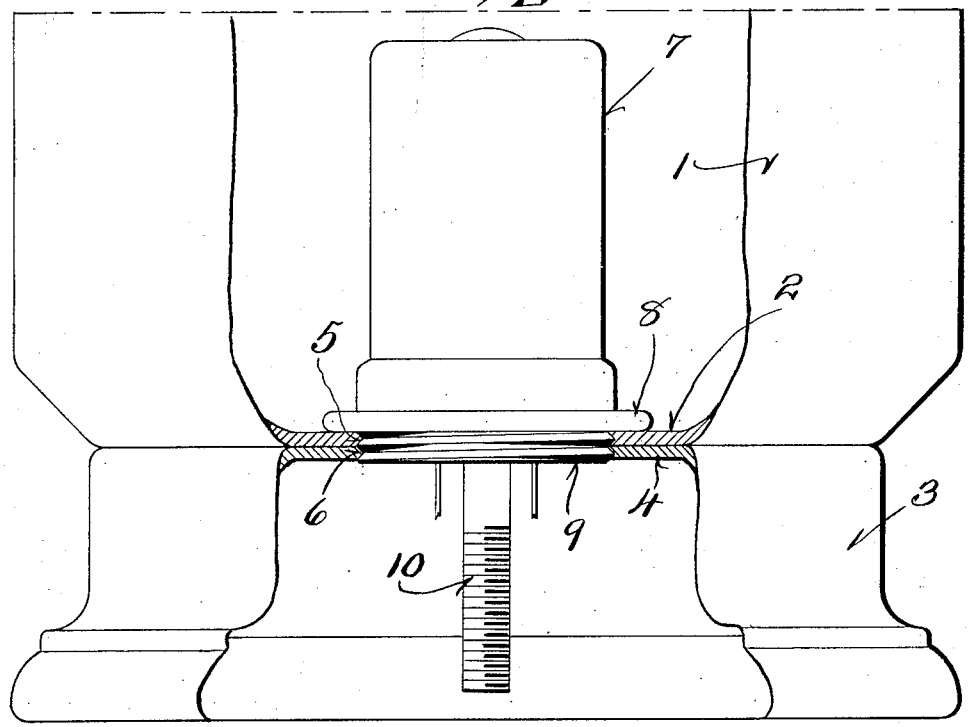
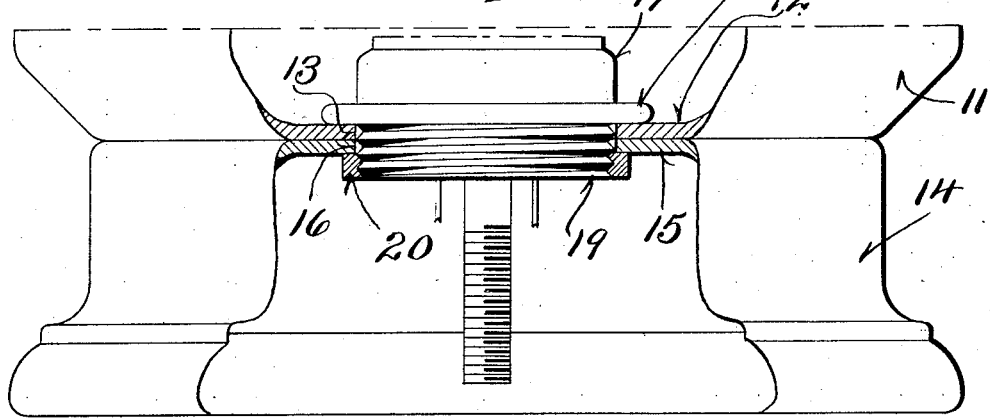
Inventors
R. Koenig
W. S. Marvin Patented Apr. 8, 1930

1,753,863

UNITED STATES PATENT OFFICE

REMUS KOENIG AND WALTER S. MARVIN, OF TWO RIVERS, WISCONSIN, ASSIGNORS TO METAL WARE CORPORATION, OF TWO RIVERS, WISCONSIN

ELECTRIC PERCOLATOR

Application filed September 4, 1928. Serial No. 303,886.

This invention relates to an electric percolator.

Objects of this invention are to provide a novel form of electric percolator, in which an emersion type of heating unit is attached to a percolator in a novel manner, and so arranged that it locks the base to the pot or body portion of the percolator at the same time that it locks the emersion type heater in place.

Further objects are to provide a very simple and strong construction, which materially reduces the mechanical operations required in assembling and attaching the parts of the percolator together.

Embodiments of the invention are shown in the accompanying drawings, in which:

Figure 1 shows a fragmentary side view, partly in section, of one form of the invention.

Figure 2 shows a similar view of a further form of the invention.

Referring to the drawings, it will be seen that the percolator body portion, or pot, is indicated by the reference character 1, and this pot is provided with a transverse body 2. The base portion is indicated by the reference character 3 and is provided with a transverse upper wall 4. Obviously these parts may be of any shape desired and the base portion may be provided with feet, if desired.

The bottom wall 2 and the transverse wall 4 are provided with threaded, centrally located apertures 5 and 6. The emersion type electric heating unit may be of any form desired and is indicated generally by the reference character 7. It is provided with a flange 8 which rests upon the bottom 2 of the pot portion and is further provided with a threaded downwardly extending projection or extension 9. This threaded extension is screwed into the threaded apertures 5 and 6 and thus firmly locks the bottom 2 of the pot to the transverse wall 4 of the base. The heating unit may be provided with a downwardly projecting, threaded stem 10 which is adapted to hold the shielding bottom plate in place, such plate being omitted from the drawings.

In the form shown in Figure 2, substantially the same construction is followed. However, the pot 11 is provided with a bottom 12 which has a centrally located aperture 13. This aperture is not threaded.

The base 14 is provided with a transverse top plate 15 which is also provided with an aperture 16 free from threads and alining with the aperture 13. The heating unit 17 is provided with a flange 18 resting upon the bottom 12 and with a relatively longer extension, or downwardly projecting, portion 19, which passes freely through the alining apertures 13 and 16. A ring nut 20 is screwed upon the threaded extension 19 and firmly clamps the bottom 12 and wall 15 together.

It is to be noted that in both forms of the invention a very secure and rigid attachment of the pot portion to the base is secured.

The threaded extension is of relatively large diameter and is not a frail or easily broken part. Instead it is sturdy and securely holds the parts together, as well as insuring the correct placing of the emersion type of heating unit.

It will be seen that a very simple construction is provided which materially reduces the number of operations necessary in assembling the electric percolator.

We claim:—

In an electric percolator, the combination of a pot having a bottom, a base member having a transverse upper wall, said bottom and said transverse wall having registered threaded apertures, and an emersion type of electric heater having a flange resting upon the bottom and having a downwardly projecting threaded extension screwed into the registering apertures whereby the base can be removed from the pot without disturbing the relative position of the heater with respect to the bottom of the pot.

In testimony that we claim the foregoing we have hereunto set our hands at Two Rivers, in the county or Manitowoc and State of Wisconsin.

REMUS KOENIG.
WALTER S. MARVIN.